(12) United States Patent
Shimura et al.

(10) Patent No.: US 8,481,230 B2
(45) Date of Patent: Jul. 9, 2013

(54) LIQUID TANK, TUBULAR STRUCTURE FOR LIQUID TANK, FUEL CELL, AND ELECTRONIC DEVICE

(75) Inventors: Jusuke Shimura, Kanagawa (JP); Kazuaki Fukushima, Kanagawa (JP)

(73) Assignee: Sony Corporation, Tokyo (JP)

( * ) Notice: Subject to any disclaimer, the term of this patent is extended or adjusted under 35 U.S.C. 154(b) by 740 days.

(21) Appl. No.: 12/602,034

(22) PCT Filed: May 23, 2008

(86) PCT No.: PCT/JP2008/059541
§ 371 (c)(1),
(2), (4) Date: Nov. 25, 2009

(87) PCT Pub. No.: WO2008/146740
PCT Pub. Date: Dec. 4, 2008

(65) Prior Publication Data
US 2010/0183953 A1    Jul. 22, 2010

(30) Foreign Application Priority Data
May 28, 2007   (JP) ................. 2007-140453

(51) Int. Cl.
*H01M 2/00* (2006.01)
*H01M 8/04* (2006.01)
*B67D 3/00* (2006.01)

(52) U.S. Cl.
USPC ........... 429/515; 429/513; 222/187; 222/478; 222/488

(58) Field of Classification Search
USPC .. 429/512–516; 220/562–565, 4.12; 222/187, 222/416, 478–489
See application file for complete search history.

(56) References Cited

U.S. PATENT DOCUMENTS

| 5,653,943 | A | * | 8/1997 | Arnold | ........................... 422/547 |
| 7,147,955 | B2 | | 12/2006 | Adams | |

(Continued)

FOREIGN PATENT DOCUMENTS

| JP | 53-57311 | 5/1978 |
| JP | 59-151822 | 10/1984 |

(Continued)

OTHER PUBLICATIONS

Japanese Office Action issued Sep. 28, 2011, corresponding to Japanese Appln. No. 2007-140453.

(Continued)

*Primary Examiner* — Jonathan Crepeau
*Assistant Examiner* — Jacob Buchanan
(74) *Attorney, Agent, or Firm* — K&L Gates LLP

(57) ABSTRACT

A liquid tank and a tubular structure for liquid tank capable of suctioning an internal liquid to the last drop even when the tank is tilted to any angle are provided. The tubular structure 40 has a duct line 41 extending from a specific position 41A in the tank body 30 in a direction toward apexes, sides, or faces of the tank body 30. Ends of the duct line 41 are contacted with the apexes, the sides, or the faces of the tank body 30, and have a liquid inlet 41B. Since the inlet 41B is limited to the ends of the duct line 41, flow of the liquid in the tank body 30 has a certain directivity that the liquid enters through only the inlet 41B into the duct line 41, is transported to the specific position 41A, and is suctioned outside. In the tubular structure 40, an inner structure 45 having voids thorough which the liquid passes such as a porous body is provided. The voids have an average pore diameter with which the liquid is able to be suctioned by capillary force from the inlet 41B to the specific position 41A, and thereby increase of flow path resistance is suppressed.

13 Claims, 11 Drawing Sheets

U.S. PATENT DOCUMENTS

| | | | |
|---|---|---|---|
| 2004/0001987 | A1 | 1/2004 | Kinkelaar et al. |
| 2004/0001989 | A1* | 1/2004 | Kinkelaar et al. ............. 429/34 |
| 2004/0151962 | A1 | 8/2004 | Adams |
| 2004/0155065 | A1 | 8/2004 | Kinkelaar et al. |
| 2005/0023236 | A1 | 2/2005 | Adams et al. |
| 2006/0108379 | A1* | 5/2006 | Glynn et al. ................. 222/211 |
| 2008/0174644 | A1* | 7/2008 | Hongo et al. ................. 347/86 |

FOREIGN PATENT DOCUMENTS

| | | |
|---|---|---|
| JP | 2003-109633 | 4/2003 |
| JP | 2004-10089 | 1/2004 |
| JP | 2005-203053 | 7/2005 |
| JP | 2005-346974 | 12/2005 |
| JP | 2005-539364 | 12/2005 |
| JP | 2006-522434 | 9/2006 |
| JP | 2007-5247 | 1/2007 |
| JP | 2007-500925 | 1/2007 |
| JP | 2008-181701 | 8/2008 |

OTHER PUBLICATIONS

International Search Report for corresponding PCT/JP2008/059541 dated Aug. 19, 2008.

* cited by examiner

LIQUID TANK, TUBULAR STRUCTURE FOR LIQUID TANK, FUEL CELL, AND ELECTRONIC DEVICE

CROSS REFERENCE TO RELATED APPLICATIONS

The present application is a national stage of International Application No. PCT/JP2008/059541 filed on May 23, 2008 and claims priority to Japanese Patent Application No. 2007-140453 filed on Mar. 28, 2007, the disclosures of which are incorporated herein by reference.

BACKGROUND

The present invention relates to a liquid tank and a tubular structure for liquid tank suitable for a fuel cell, a fuel cell using the same, and an electronic device containing such a fuel cell.

A fuel cell system generally has therein a tank to store a fuel. In a fuel tank of a fuel cell system mounted on a portable device, it is requested to suction the liquid in the tank to the last drop even when the tank is tilted to any angle. To meet such a request, in the past, for example, as illustrated in FIG. 12, a fuel tank 120 having a double structure in which a liquid fuel 121 is enclosed into a sac-like container 120A and the container is covered with an outer case 120B in the shape of a rectangular solid and the like are used. However, in this method, as the fuel is suctioned, the container is gradually deflated. Thus, a large suction pressure to suction the fuel to the last drop is necessitated, resulting in a problem that the fuel is not able to be used up to the last virtually. Further, due to the double structure composed of the sac-like container 120A and the outer case 120B, there is a problem that a dead space 122 is generated.

For example, in Patent Document 1, a description is given that an X-shaped suction structure composed of a porous material is provided in a container, and a liquid fuel is suctioned by capillary action.

Patent Document 1: Japanese Unexamined Patent Application Publication No. 2005-539364 (claim 1, claim 157, and FIG. 25)

SUMMARY

However, in the existing suction structure, the liquid or the like is able to enter and exit any face of the porous material, and a liquid inlet is not particularly limited. In the case where a remaining amount of the liquid fuel is small, the liquid fuel gathers at an apex, a side, or a face at the bottom. However, in the existing suction structure, since air is introduced through the side face of the porous material, the liquid level of the liquid fuel gathering at the apex, the side, or the face is not able to be sufficiently under the negative pressure. It results in a problem that the liquid fuel is not able to be suctioned to the last drop.

In view of the foregoing problems, it is an object of the present invention to provide a liquid tank and a tubular structure for liquid tank capable of suctioning the inner liquid to the last drop even when the tank is tilted to any angle, a fuel cell using the same, and an electronic device containing such a fuel cell.

A liquid tank of the present invention includes a tank body into which a liquid is enclosed; and a tubular structure being provided in the tank body, and having a plurality of duct lines extending from a specific position in the tank body in a direction toward two or more apexes, sides, or faces, in which each end of the plurality of duct lines is contacted with one of the apexes, the sides, and the faces of the tank body and is provided with a liquid inlet.

A tubular structure for liquid tank of the present invention is provided in a tank body into which a liquid is enclosed, and has a duct line extending from a specific position in the tank body in a direction toward two or more apexes, sides, or faces. Ends of the duct line are contacted with the apexes, the sides, or the faces of the tank body and have a liquid inlet.

A fuel cell of the present invention includes a power generation section and a fuel tank. The fuel tank is composed of the foregoing liquid tank of the present invention.

An electronic device of the present invention includes a fuel cell including a power generation section and a fuel tank. The fuel tank is composed of the foregoing liquid tank of the present invention.

In the liquid tank of the present invention or the tubular structure for liquid tank of the present invention, the liquid inlet is limited to only the ends of the duct line. Thus, flow of the liquid in the tank body has a certain directivity that the liquid enters through only the inlet into the duct line, is transported to the specific position in the tank body, and is suctioned to outside of the tank body. If the liquid in the tank body is decreased, the liquid existing in one of the apexes, the sides, and the faces enters through the inlet of the end of the duct line contacted with such one of the apexes, the sides, and the faces.

In the fuel cell of the present invention, the foregoing liquid tank of the present invention is included. Thus, a liquid fuel is surely suctioned to the last drop. Therefore, in the electronic device including the fuel cell, usage efficiency of the liquid fuel is improved, and convenience is improved.

According to the liquid tank of the present invention or the tubular structure for liquid tank of the present invention, the inlets of the liquid are provided at the ends of the duct line. Thus, the direction of the liquid flow becomes constant, and the liquid is surely suctioned even if the liquid amount becomes small. Therefore, the liquid in the tank body is able to be suctioned to the last drop even when the tank body is tilted to any angle. In particular, the present invention is suitable for a fuel cell mounted on a portable electronic device. In this case, usage efficiency of the liquid fuel is improved, and convenience of the device can be improved.

Additional features and advantages of the present invention are described in, and will be apparent from, the following Detailed Description and the Figures.

DETAILED DESCRIPTION

An embodiment of the present invention will be hereinafter described in detail with reference to the drawings.

Figure 1:
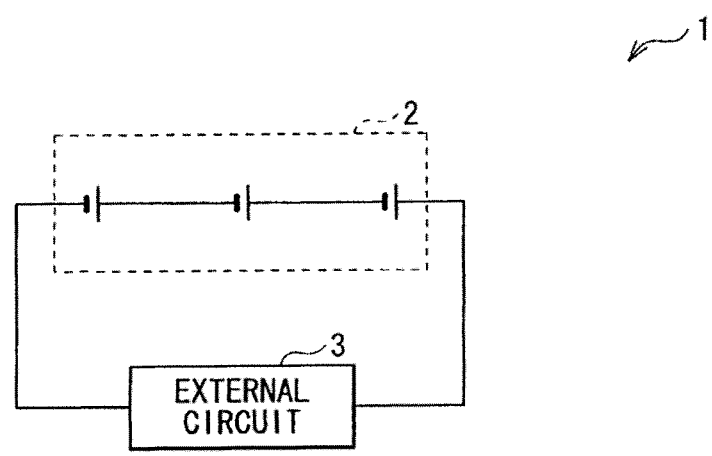
FIG. 1 is a view illustrating a configuration of an electronic device according to an embodiment of the present invention.

FIG. 1 illustrates a configuration of an electronic device including a fuel cell according to an embodiment of the invention. An electronic device 1 is, for example, a mobile device such as a mobile phone and a Personal Digital Assistant (PDA) or a portable electronic device such as a notebook Personal Computer (PC). Electric energy generated by a fuel cell 2 is supplied to an external circuit 3.

Figure 2:
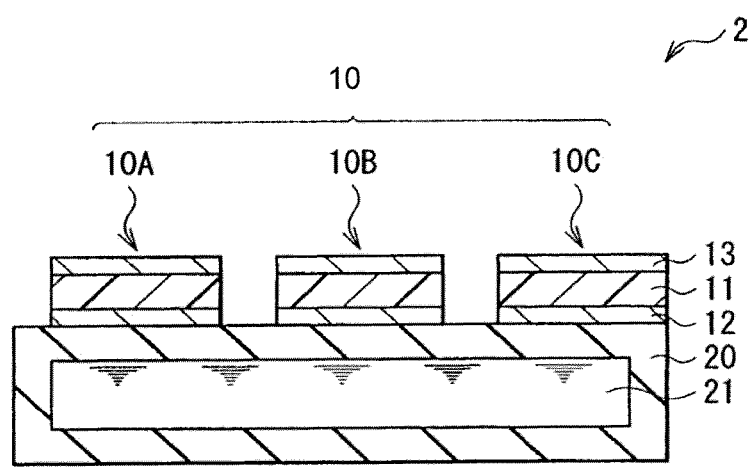
FIG. 2 is a cross sectional view illustrating a structure of the fuel cell illustrated in FIG. 1.

FIG. 2 illustrates a structure of the fuel cell 2. The fuel cell 2 includes a power generation section 10 in which a plurality of (for example, three) unit cells 10A to 10C are electrically connected in series and a fuel tank 20 containing a liquid fuel 21 (for example, methanol water).

The unit cells 10A to 10C are respectively, for example, direct methanol fuel cells in which power generation is operated by reaction between methanol and oxygen. The unit cells 10A to 10C have a fuel electrode 12 and an oxygen electrode 13 that are oppositely arranged with an electrolyte film 11 in between.

The electrolyte film 11 is made of, for example, a proton conducting material having a sulfonate group ($—SO_3H$). Examples of proton conducting material include polyperfluoroalkyl sulfonate-based proton conducting material (for example, "Nafion (registered trademark)," manufactured by Du Pont), a hydrocarbon proton conducting material such as a polyimide sulfonate, and a fullerene-based proton conducting material.

The fuel cell 12 and the oxygen electrode 13 have a structure in which a catalyst layer including a catalyst such as platinum (Pt) and ruthenium (Ru) is formed on a current collector made of, for example, a carbon paper. The catalyst layer is made of a substance in which a support such as carbon black that supports the catalyst is dispersed in a polyperfluoroalkyl sulfonate-based proton conducting material or the like. An air supply pump (not illustrated) may be connected to the oxygen electrode. Otherwise, air, that is, oxygen may be supplied by natural ventilation.

Figure 3:
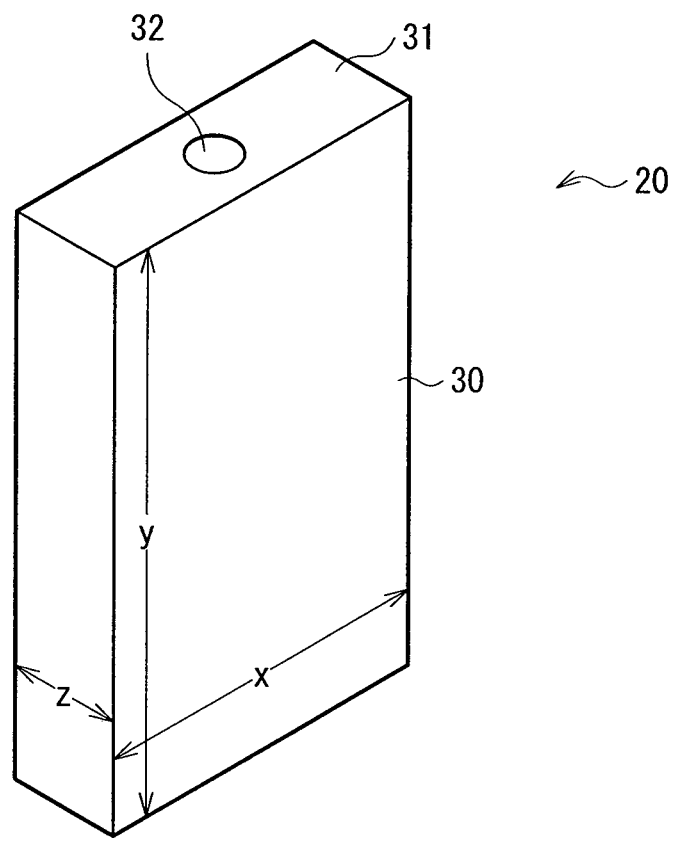
FIG. 3 is a perspective view illustrating an appearance of the fuel tank illustrated in FIG. 2.
Figure 4:
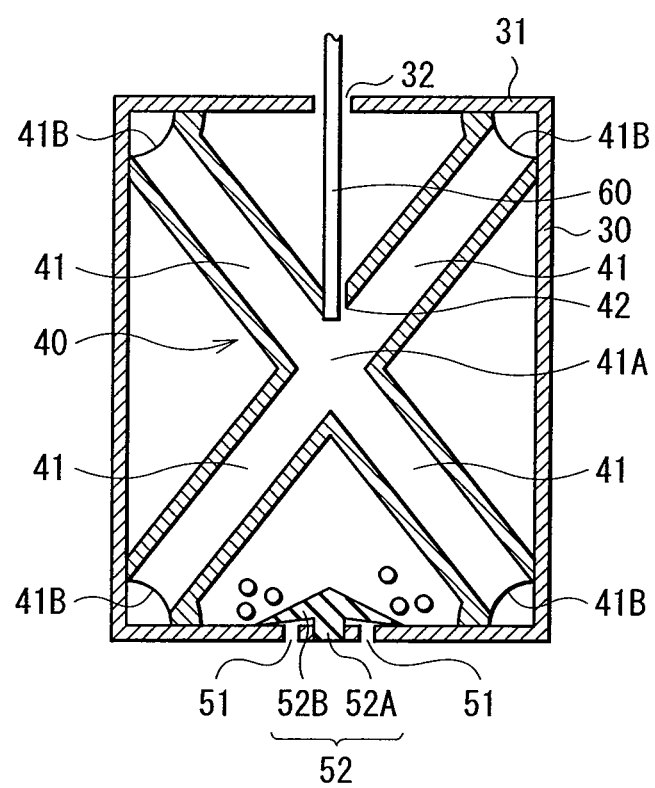
FIG. 4 is a cross sectional view illustrating an example of internal structure of the fuel tank illustrated in FIG. 3.

FIG. 3 illustrates an appearance of the fuel tank 20, and FIG. 4 illustrates inside of the fuel tank 20. The fuel tank 20 has, for example, a tank body 30 into which a liquid is enclosed and a tubular structure 40 provided in the tank body 30. Further, the tank body 30 has an air inlet 51. The inlet 51 is provided with a back-flow prevention mechanism 52 to limit direction of flow of air and the liquid fuel 21 to one direction into the tank body 30.

The tank body 30 is in the shape of, for example, a rectangular solid, and is made of a metal material such as aluminum (Al). An upper cover 31 of the tank body 30 is provided with an opening 32 for injecting and suctioning the liquid fuel 21.

The tubular structure 40 has a duct line 41 extending from a specific position 41A in the tank body 30 in a direction toward two or more apexes, sides, or faces of the tank body 30. Ends of the duct line 41 are contacted with the apexes, the sides, or the faces of the tank body 30, and have an inlet 41B of the liquid fuel 21. Thereby, in the fuel tank 20, the liquid fuel 21 in the tank body 30 can be suctioned to the last drop even when the tank body 30 is tilted to any angle.

Figure 5:
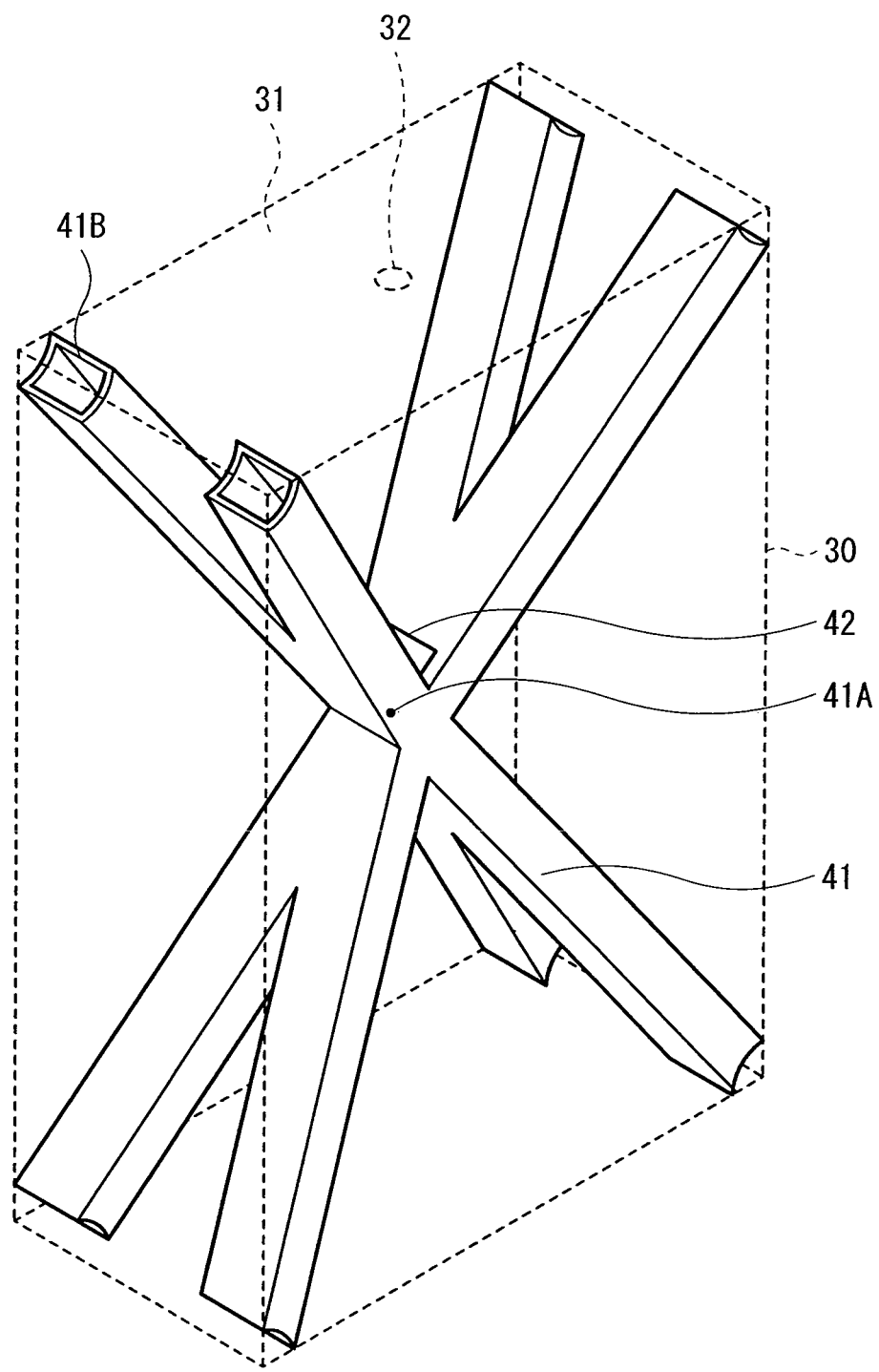
FIG. 5 is a perspective view illustrating an example of the tubular structure illustrated in FIG. 4.
Figure 6:
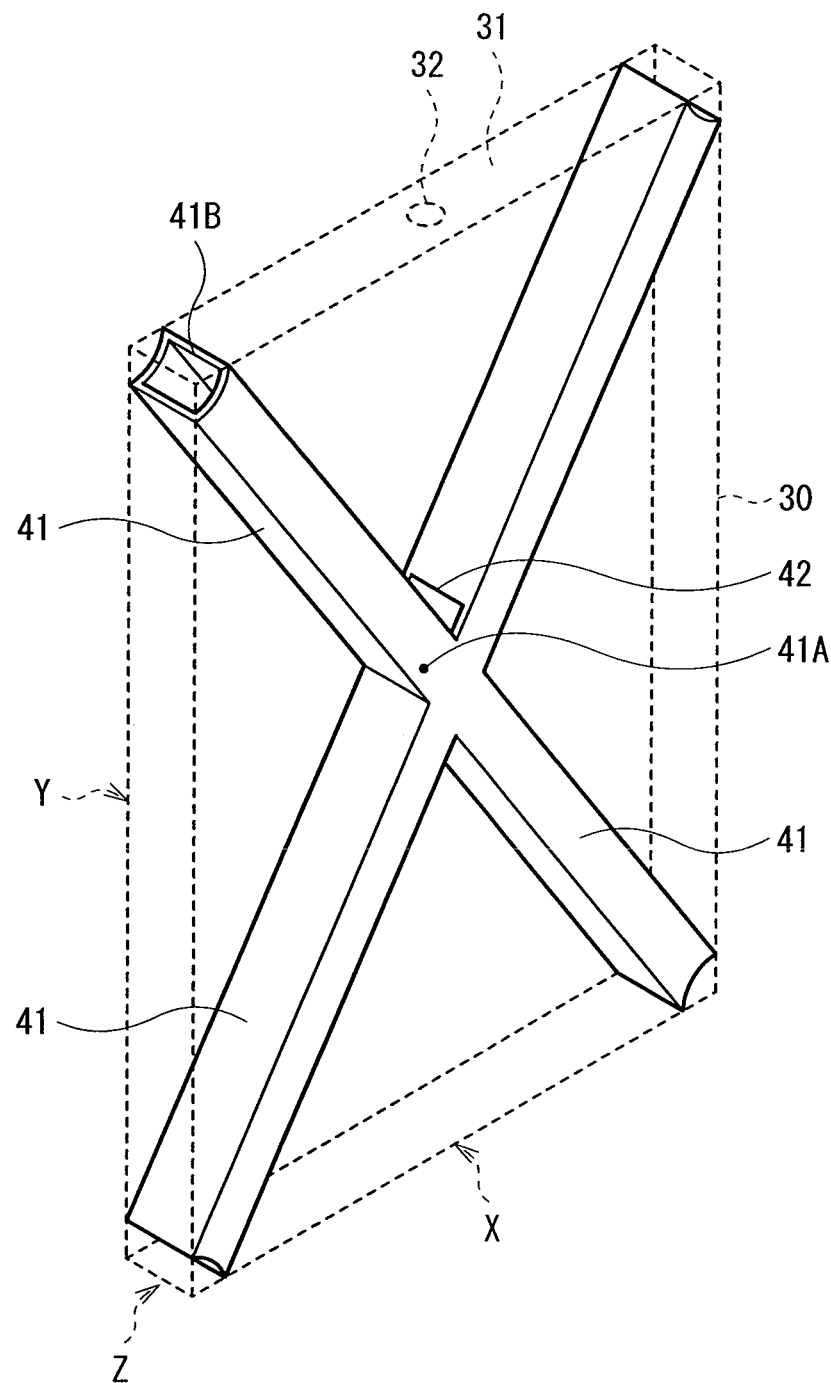
FIG. 6 is a perspective view illustrating another example of the tubular structure.

In the case where the tank body 30 is in the shape of a rectangular solid as described above, it is preferable that, for example, as illustrated in FIG. 5, the duct lines 41 extend from the specific position 41A in a direction toward eight apexes of the tank body 30, and the ends of the duct lines 41 are contacted with the eight apexes of the tank body 30. In particular, in the case where the tank body 30 is in the shape of a planular rectangular solid, that is, a rectangular solid in which a length of four sides z in the thickness direction is shorter than a length of four sides x in the width direction and a length of four sides y in the height direction, it is preferable that, for example as illustrated in FIG. 6, the duct lines 41 extend in a direction toward the four sides z in the thickness direction, and the ends of the duct lines 41 are contacted with the four sides z in the thickness direction of the tank body. Thereby, orientation dependence is able to be eliminated, and it becomes available to address any angle in the true sense of the term, that is, to address any roll angle (rotation angle of the anterior-posterior axis), any pitch angle (rotation angle of the left-right axis), and any yaw angle (rotation angle of the vertical axis).

Figure 7:
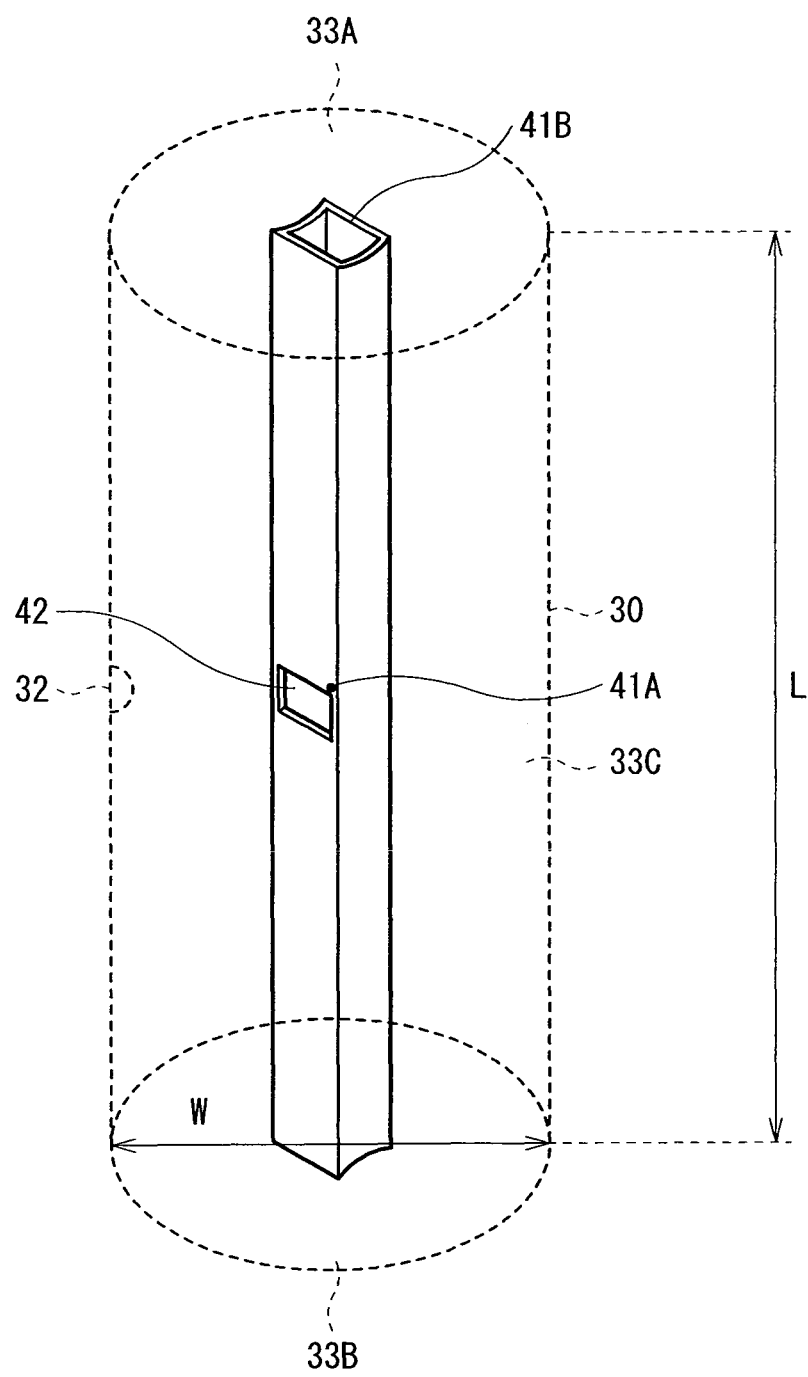
FIG. 7 is a perspective view illustrating still another example of the tubular structure.

Further, the tank body 30 may be in the shape of a cylinder as illustrated in FIG. 7, that is, may be in the shape having two end faces 33A and 33B and a side face 33C between the two end faces 33A and 33B. The two end faces 33A and 33B may be in the shape including a curved line such as an oval or in the shape of a polygon in addition to a circle. A dimension L in the longitudinal direction of the side face 33C is sufficiently longer than a diameter or a maximum width W of the two end faces 33A and 33B. The opening 32 and the back-flow prevention mechanism 52 may be provided in one of the two end faces 33A and 33B, or may be provided in the side face 33C.

In the case where the tank body 30 is in the shape of a cylinder as above, for example, the duct line 41 may extend from the specific position 41A in a direction toward the two end faces 33A and 33B of the tank body 30, and the ends of the duct line 41 may be contacted with the two end faces 33A and 33B of the tank body 30. Thereby, orientation dependence can be eliminated as well. The ends of the duct line 41 are preferably contacted with the center of the end faces 33A and 33B. In this case, as in the case of the rectangular solid tank body 30 as described above, the duct line 41 may have an eight-direction-branch structure or a four-direction-branch structure.

The specific position 41A as a starting point of the duct lines 41 is preferably located at the central position of the tank body 30. Thereby, distances of the all duct lines 41 in all directions can be equal to each other, which is advantageous to resolving orientation dependence. The specific position 41A is provided with a connection hole 42 to forcefully suction the liquid fuel 21 by an injector or the like. The connection hole 42 is desirably provided with a part (not illustrated) as an attachment guide in connecting a needle 60 such as an injector to the connection hole 42 through the opening 32.

The duct line 41 is composed of, for example, one tube, and has an inner diameter with which the liquid fuel 21 is able to be suctioned from the inlet 41B to the specific position 41A by capillary force. Specifically, in the case where the specific position 41A is located at the central position of the tank body 30, a radius r of the duct line 41 satisfies Mathematical formulas 1.

$$SQR(x^2+y^2+z^2) < 4\gamma \cos \theta / r\rho g$$

$$H1 = 2\gamma \cos \theta / r\rho g$$

$$H2 = SQR(x^2+y^2+z^2)/2 \quad \text{(Mathematical Formulas 1)}$$

(In the formulas, SQR(a) represents square root of a; x, y, and z represent a length of each side of the tank body 30 (m); H1 represents a height of liquid level rise by capillary force in the case of the cylindrical tube (m); γ represents a surface tension of the liquid (N/m); θ represents a contact angle; r represents a radius of the tube (m); ρ represents a density of the liquid (kg/m³); g represents a gravity acceleration (9.8 m/s²); and H2 represents a height of liquid level rise necessary in the fuel tank 20 (m)).

The second formula of Mathematical formulas 1 represents the height H1 of liquid level rise by capillary force in the case where the duct line 41 is composed of a cylindrical tube. The third formula of Mathematical formulas 1 represents the height H2 of liquid level rise necessary in the fuel tank 20. That is, in order to suction the liquid fuel 21 from the specific position 41A to outside of the tank body 30 by the needle 60, the liquid level of the liquid fuel 21 should be increased by capillary force from the inlet 41B to at least the specific position 41A. Thus, in the case where the tank body 30 is in the shape of a rectangular solid, the height H2 of liquid level rise necessary in the fuel tank 20 is a distance from each apex of the tank body 30 to the specific position 41A, that is, the central position of the tank body 30. Accordingly, under the condition that H2<H1 is satisfied, that is, under the condition that the first formula of Mathematical formulas 1 is satisfied, it is necessary to select the dimensions of the tank body 30 or the material of the duct line 41, and select the inner diameter of the duct line 41. It is needless to say that in the case where the specific position 41A is not located at the central position of the tank body 30, the third formula of Mathematical formulas 1 to obtain the height H2 is different.

In the case where the duct line 41 is composed of one tube, the material and the inner diameter of the duct line 41 can be obtained by substituting rough dimensions and rough physical values in the first formula of Mathematical formulas 1. For example, it is found that where the dimensions x, y, and z of the tank body 30 are respectively 18 mm×34 mm×5.5 mm, and values of γ=21 N/m, θ=30 deg, and ρ=0.79 g/cm³ are substituted as rough physical values, the radius r of the duct line 41 should be 242 μm or less. That is, it is found that the duct line 41 should be made of a material having a contact angle of about 30 deg with favorable wetting characteristics, and the inner diameter should be less than 484 μm.

However, the inner diameter of 484 μm is an extremely small value, with which if trial is made to forcefully suction the liquid fuel, flow path resistance is high and a considerable suction pressure is necessitated. To resolve such a problem, for example, the duct line 41 may be composed of a bundle of smaller tubes obtained by bundling a plurality of tubes with an inner diameter of 484 μm, or may be composed of a porous body, a spongy material, a foam, or a fibrous material (hereinafter referred to as "foam or the like") with an average pore diameter of about 484 μm or less. In addition, strictly speaking, the inner diameter of the tube is not substituted with the average pore diameter of the foam or the like, but it is considered that no problem arises to discuss the approximate number. Further, there is another big difference between the tube and the foam or the like. The tube has entrance and exit of liquid only on the both end faces. Meanwhile, in the foam or the like, entrance and exit of liquid are available through any face thereof, and the flow direction is not constant. The foam or the like herein works as a substitute for the tube.

Thus, it is important that the side face of the foam or the like is covered, that is, the duct line 41 is filled with the foam or the like so that entrance and exit of liquid are available only on the both end faces in the same manner as in the tube.

Figure 8:
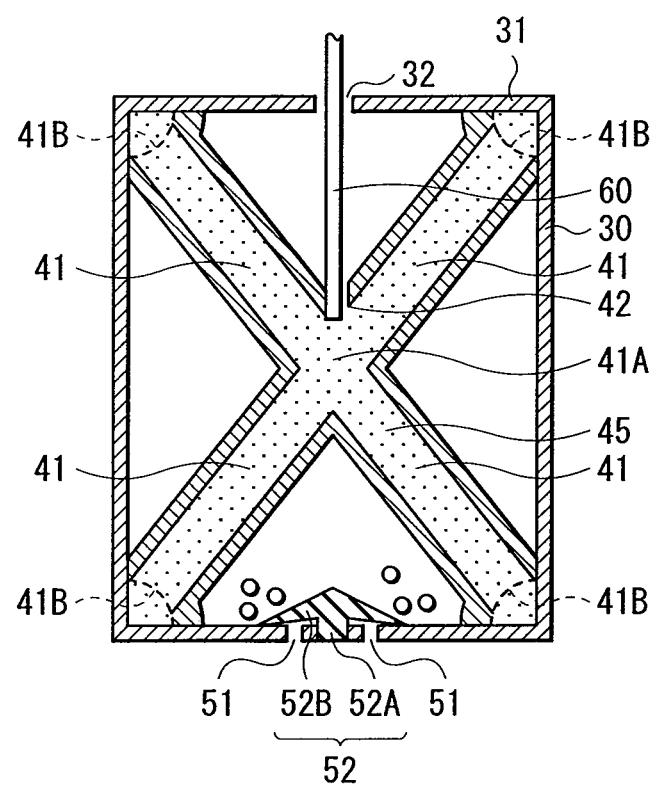
FIG. 8 is a cross sectional view illustrating another example of internal structure of the fuel tank illustrated in FIG. 3.
Figure 9:
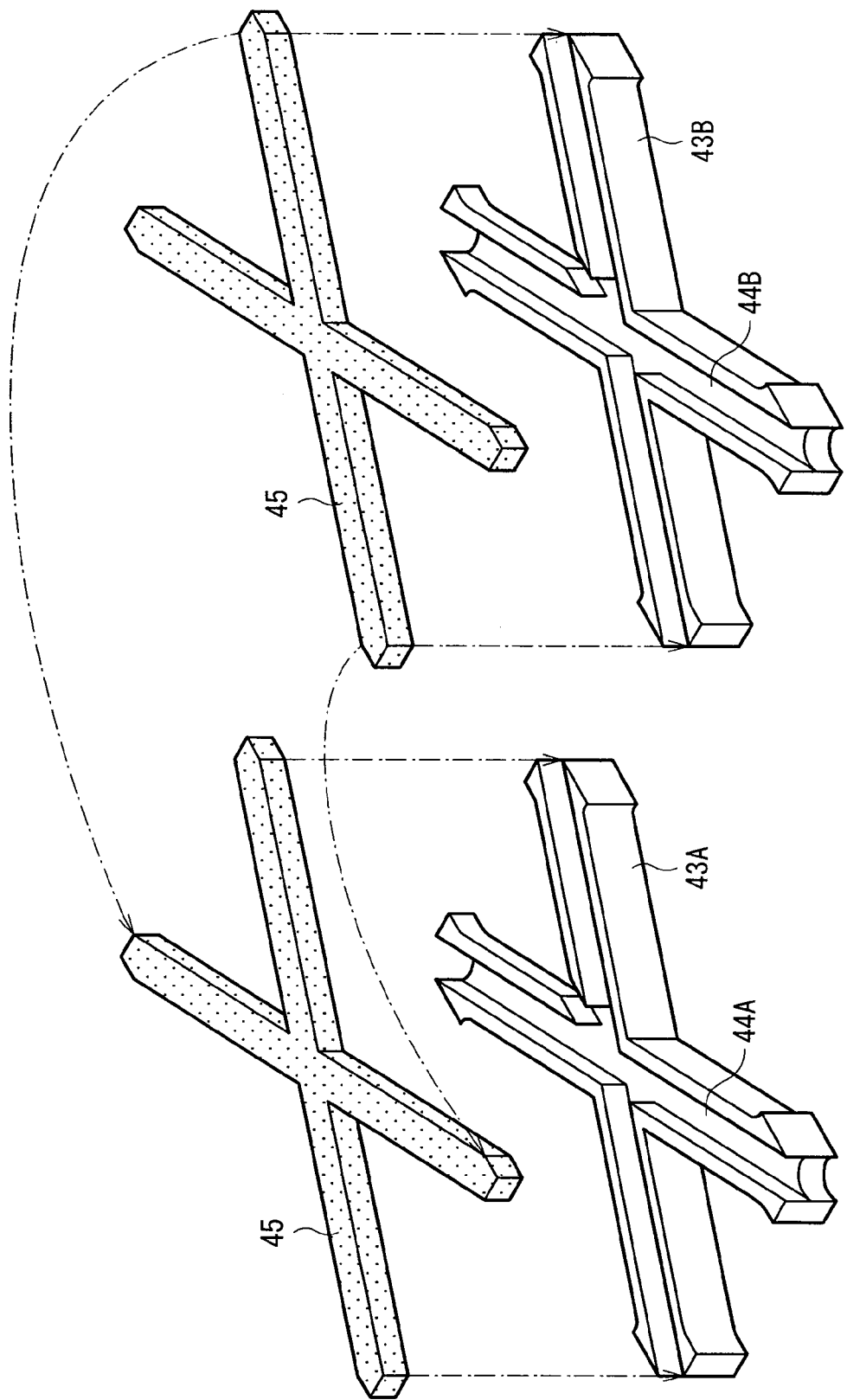
FIG. 9 is an exploded perspective view illustrating an example of the tubular structure illustrated in FIG. 5.

FIG. 8 and FIG. 9 illustrate an example of internal structure of the tubular structure 40 based on the foregoing technical idea. The tubular structure 40 has a structure in which a pair of X-shaped halved members 43A and 43B made of stainless steel (for example, SUS304) or the like is layered and bonded by an adhesive (not illustrated). The halved members 43A and 43B are respectively provided with grooves 44A and 44B, which are aligned with each other to structure the duct line 41.

Inside of the tubular structure 40, an inner structure 45 having voids thorough which the liquid fuel 21 passes such as the porous body, the spongy material, the foam, the fibrous material, and the bundle of smaller tubes is provided. The voids in the inner structure 45 have an average pore diameter with which the liquid fuel 21 is able to be suctioned by capillary force from the inlet 41B to the specific position 41A. Specifically, the average pore diameter of the inner structure 45 satisfies requirements similar to Mathematical formulas 1 for the radius r in the case where the duct line 41 is composed of one tube. Thereby, in the fuel tank 20, the duct line 41 is able to be thick, increase of the flow path resistance can be suppressed, the suction rate or the suction amount of the liquid fuel 21 can be increased, and the suction pressure of the liquid fuel 21 can be decreased. The inner structure 45 may be one of the porous body, the spongy material, the foam, the fibrous material, and the bundle of smaller tubes, or may be a mixture thereof.

The inner structure 45 is made of a material with favorable wetting characteristics for the liquid fuel 21, that is, a material having the contact angle θ of the liquid fuel 21 of less than 90 deg. Based on the first formula of Mathematical formulas 1, in order to obtain a positive value of the radius r of the tube, the contact angle θ should be less than 90 deg (in the case of θ>90, it results in cos θ<0), and the average pore diameter of the inner structure 45 should satisfy requirements similar to those of the radius r of the tube as well. Incidentally, based on the first formula of Mathematical formulas 1, in order to increase the dimensions of the tank body 30, the smaller pore diameter of the inner structure 45 is better, and the higher wetting characteristics are better.

As a material of the inner structure 45, for example, a natural fiber, an animal fiber, polyacetal, an acryl resin, a polyester resin such as polyethylene terephthalate, a polyamide resin such as nylon, a polyolefin-based resin such as polyurethane, polypropylene, and polyethylene, polyvinyl, polycarbonate, a polyether resin, a polyphenylene resin, a polylactate resin, a foam metal, a foam oxide, zeolite, and an unglazed pottery are suitable. Such a material may be provided with ozone treatment to improve the wetting characteristics for methanol. The inner structure 45 is able to be made of foam, a felt, a felt sintered body, or a particle sintered body that is composed of one of the foregoing material or a mixture of two or more thereof. Specific material examples include, for example, a porous metal body composed of nickel (Ni) (for example, "Celmet (trade name)," Sumitomo Electric Toyama Co., Ltd. make). The porous metal body is a body in which a nickel film is formed on the surface of a resin foam by electroplating. The porous metal body has a three-dimensional framework structure.

For the air inlet 51 illustrated in FIG. 4 and FIG. 8, for example, two air inlets 51 are provided on the bottom face of the tank body 30. At the midpoint thereof, a through hole 53 for providing the back-flow prevention mechanism 52 (refer to FIG. 11) is provided. The back-flow prevention mechanism 52 is intended to prevent back flow of the liquid fuel 21 while taking in air. As long as the foregoing function as a back-flow prevention valve is included, the structure thereof is not particularly limited. For example, the back-flow prevention mechanism 52 is made of a silicone resin, and has a plug-like section 52A plugging the through hole 53 and an umbrella-like section 52B covering the inlet 51.

The fuel cell 2 can be manufactured, for example, as follows. In the following manufacturing method, a description will be given of a case that the tubular structure 40 having the inner structure 45 illustrated in FIG. 8 and FIG. 9 is formed.

First, a thin plate made of the foregoing porous metal body is cut in accordance with the shape of the grooves 44A and 44B to form the inner structure 45. Further, the halved members 43A and 43B made of the foregoing material are prepared. As illustrated in FIG. 9, the inner structure 45 is embedded in the respective grooves 44A and 44B of the halved members 43A and 43B. The halved members 43A and 43B are thermally adhered by an adhesive such as maleic acid modified polypropylene (not illustrated). Thereby, the tubular structure 40 having the inner structure 45 illustrated in FIG. 5 is formed.

Next, the ends of the two duct lines 41 of the tubular structure 40 are adhered to the upper cover 31 of the tank body 30 by an adhesive (not illustrated). The connection hole 42 is attached with the part as the attachment guide of the needle 60 (not illustrated) according to needs. Subsequently, the back-flow prevention mechanism 52 is provided on the bottom face of the tank body 30 made of the foregoing material. The tubular structure 40 is contained in the tank body 30, the upper cover 31 is adhered by, for example, a silicone adhesive (not illustrated), and thereby the tank body 30 is hermetically sealed.

Further, the electrolyte film 11 made of the foregoing material is sandwiched between the fuel electrode 12 and the oxygen electrode 13 that are made of the foregoing material, and the resultant is thermally compression-bonded. Thereby, the fuel electrode 12 and the oxygen electrode 13 are jointed to the electrolyte film 11 to form the unit cells 10A to 10C. After that, the unit cells 10A to 10C are connected in series electrically, and the fuel tank 20 is arranged on the fuel electrode 12 side of the unit cells 10A to 10C. Accordingly, the fuel cell 2 illustrated in FIG. 1 is completed.

In the fuel cell 2, the liquid fuel 21 is supplied from the fuel tank 20 to the fuel electrode 12 of the respective unit cells 10A to 10C, and reaction is initiated to generate a proton and an electron. The proton is moved through the electrolyte film 11 to the oxygen electrode 13, and is reacted with an electron and oxygen to generate water. Thereby, part of chemical energy of the liquid fuel 21, that is, methanol is converted to electric energy, which is extracted as a current, and the external circuit 3 is driven. In this embodiment, the inlets 41B of the liquid fuel 21 to the tubular structure 40 are limited to only the ends of the duct lines 41. Thus, flow of the liquid fuel 21 in the tank body 30 has a certain directivity that the liquid fuel 21 enters through only the inlets 41B into the duct lines 41, is transported to the specific position 41A in the tank body 30, and suctioned to outside of the tank body 30. If the liquid fuel 21 in the tank body 30 is decreased, the liquid fuel 21 existing in one of four short sides of the tank body 30 enters through the inlet 41B of the end of the duct line 41 contacted with the short side into the duct line 41. Therefore, the liquid fuel 21 is suctioned to the last drop even when the tank body 30 is tilted to any angle.

Further, the air inlet 51 and the back-flow prevention mechanism 52 are provided on the bottom face of the tank body 30. Thus, if trial is made to refill with methanol through the opening 32 of the upper cover 31 after the liquid fuel 21 is suctioned to the last drop, only the inner pressure of the tank body 30 is increased, and injection is not enabled. If the bottom face of the tank body 30 is straightly soaked in methanol, and air is suctioned through the opening 32, methanol injected from the inlet 51 of the bottom face immediately passes through the tubular structure 40 and is effectively moved to the opening 32, and thus the tank body 30 is not able to be filled with methanol. Thus, since the fuel tank 20 includes the tubular structure 40 and the back-flow prevention mechanism 52, after going on sale, a user hardly refills with a fuel, and thus safety lapse due to refilling with an unsuitable fuel is able to be prevented from occurring.

Further, as illustrated in FIG. 8 and FIG. 9, the inner structure 45 made of at least one of the porous body, the spongy material, the foam, the fibrous material, and the bundle of smaller tubes is provided in the tubular structure 40. Thus, increase of the flow path resistance of the duct line 41 is suppressed, the suction rate or the suction amount of the liquid fuel 21 is increased, and the suction pressure of the liquid fuel 21 is decreased.

Figure 10:
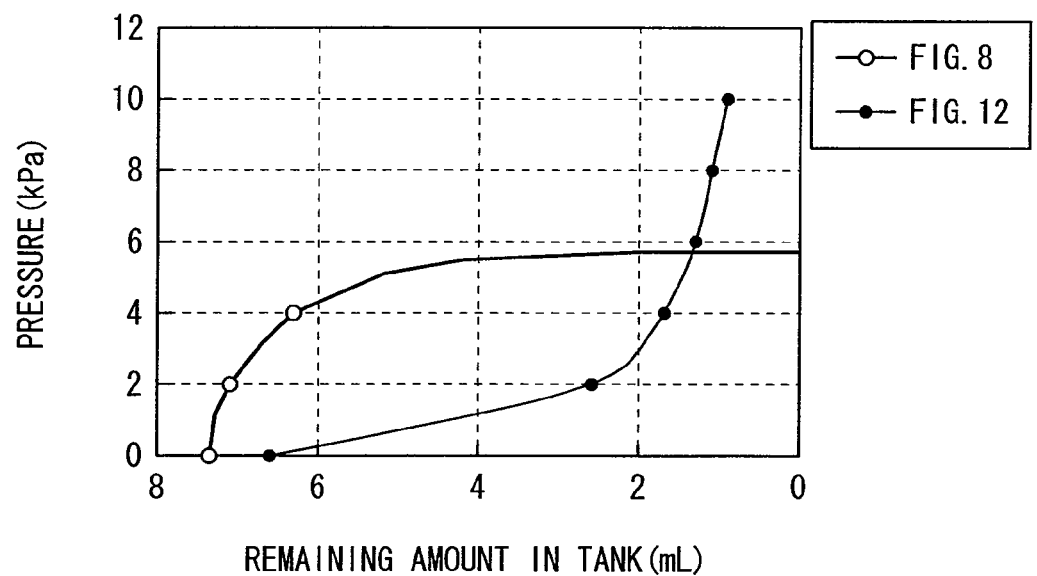
FIG. 10 is a view for explaining change of the suction pressure of the fuel tank illustrated in FIG. 1 in contrast with an existing fuel tank.

FIG. 10 is intended to explain change of the suction pressure in the fuel tank 20 including the tubular structure 40 illustrated in FIG. 8. The change of the suction pressure of the fuel tank 20 has following four features:
(1) The fuel tank 20 does not have a double structure and thus the dead space is small. Accordingly, the amount of the liquid fuel 21 with which the fuel tank 20 is filled initially is increased.
(2) At the initial term of suction, the suction pressure is low since the liquid fuel 21 pooled in the tubular structure 40 is suctioned.
(3) At the midterm and the latter term of suction, the suction pressure is hardly changed.
(4) Suction is enabled to the last drop.

The fuel tank 20 having the tubular structure 40 was actually fabricated by the foregoing manufacturing method, and the liquid fuel 21 was suctioned by an injector. In the result, if one of the duct lines 41 was contacted with the liquid level, only the liquid fuel 21 was able to be suctioned without entry of air bubbles. Such a phenomenon was confirmed both in the state before assembly (before adhering the upper cover 31 to the tank body 30) and in the state after assembly was completed. Further, it was also confirmed that the suction pressure was hardly changed to the last drop was suctioned.

Figure 12:
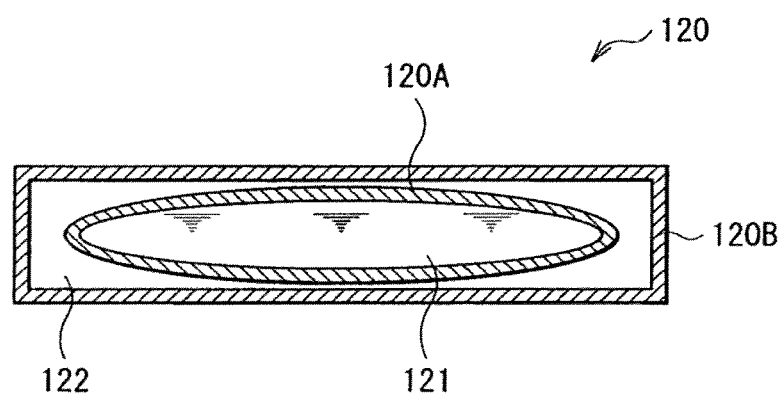
FIG. 12 is a cross sectional view illustrating an example of the existing fuel tank.

Further, FIG. 10 also illustrates the result of measuring change of the suction pressure for the existing fuel tank 120 having the double structure as illustrated in FIG. 12. As evidenced by FIG. 10, in the existing fuel tank 120 having the double structure, as the remaining amount of the liquid fuel 121 became smaller, the suction pressure was significantly increased.

The change of the suction pressure in the existing fuel tank 120 having the double structure was measured as follows. First, methanol as the liquid fuel 121 was injected into the fuel tank 120 by using an injector. When the needle of the injector was taken out, the excessively filled liquid fuel 121 was squirted. After the excessively filled liquid fuel 121 was sufficiently squirted, the remaining amount of the liquid fuel 121 in the fuel tank 120 was measured, and the measured remaining amount was regarded as the initial filling amount.

Next, the liquid fuel 121 was suctioned at the suction pressure of 2 kPa. After that, the remaining amount of the liquid fuel 121 in the fuel tank 120 was measured. Next, the liquid fuel 121 was suctioned at the suction pressure of 4 kPa. After that, the remaining amount of the liquid fuel 121 in the fuel tank 120 was measured. Subsequently, the liquid fuel 121 was suctioned at the suction pressure of 6 kPa. After that, the remaining amount of the liquid fuel 121 in the fuel tank 120 was measured. After that, the liquid fuel 121 was suctioned at the suction pressure of 8 kPa. After that, the remaining amount of the liquid fuel 121 in the fuel tank 120 was measured. Finally, the liquid fuel 121 was suctioned at the suction pressure of 10 kPa. After that, the remaining amount of the liquid fuel 121 in the fuel tank 120 was measured, and the remaining amount was regarded as the final filling amount.

The initial filling amount was 6.6 cm$^3$. The remaining amount of the liquid fuel 121 in the fuel tank 120 after the liquid fuel 121 was suctioned at the suction pressure of 2 kPa was 2.6 cm$^3$. The respective remaining amounts of the liquid fuel 121 in the fuel tank 120 after the liquid fuel 121 was suctioned at the suction pressures of 4 kPa, 6 kPa, 8 kPa, and 10 kPa were 1.6 cm$^3$, 1.3 cm$^3$, 1.1 cm$^3$, and 0.9 cm$^3$. It was found that if suctioning was made by using 10 kPa pump, the filling capacity of the fuel tank 120 (value obtained by subtracting the final filling amount from the initial filling amount (initial filling amount-final filling amount)) was 5.7 cm$^3$.

As described above, in this embodiment, the inlet 41B of the liquid fuel 21 is provided at the end of the duct line 41. Thus, the flow direction of the liquid fuel 21 becomes constant, and the liquid fuel 21 can be surely suctioned even if the amount of the liquid fuel 21 becomes small. Thus, the liquid fuel 21 in the tank body 30 can be suctioned to the last drop even when the tank body 30 is tilted to any angle. In particular, the embodiment is suitable for the fuel cell 2 mounted on the portable electronic device 1. In this case, usage efficiency of the liquid fuel 21 is improved, and convenience of the device can be improved.

In particular, the inner structure 45 made of at least one of the porous body, the spongy material, the foam, the fibrous material, and the bundle of smaller tubes is provided in the tubular structure 40. Thus, increase of the flow path resistance can be suppressed, the suction rate or the suction amount of the liquid fuel 21 can be increased, and the suction pressure of the liquid fuel 21 can be decreased.

MODIFIED EXAMPLE

Figure 11:
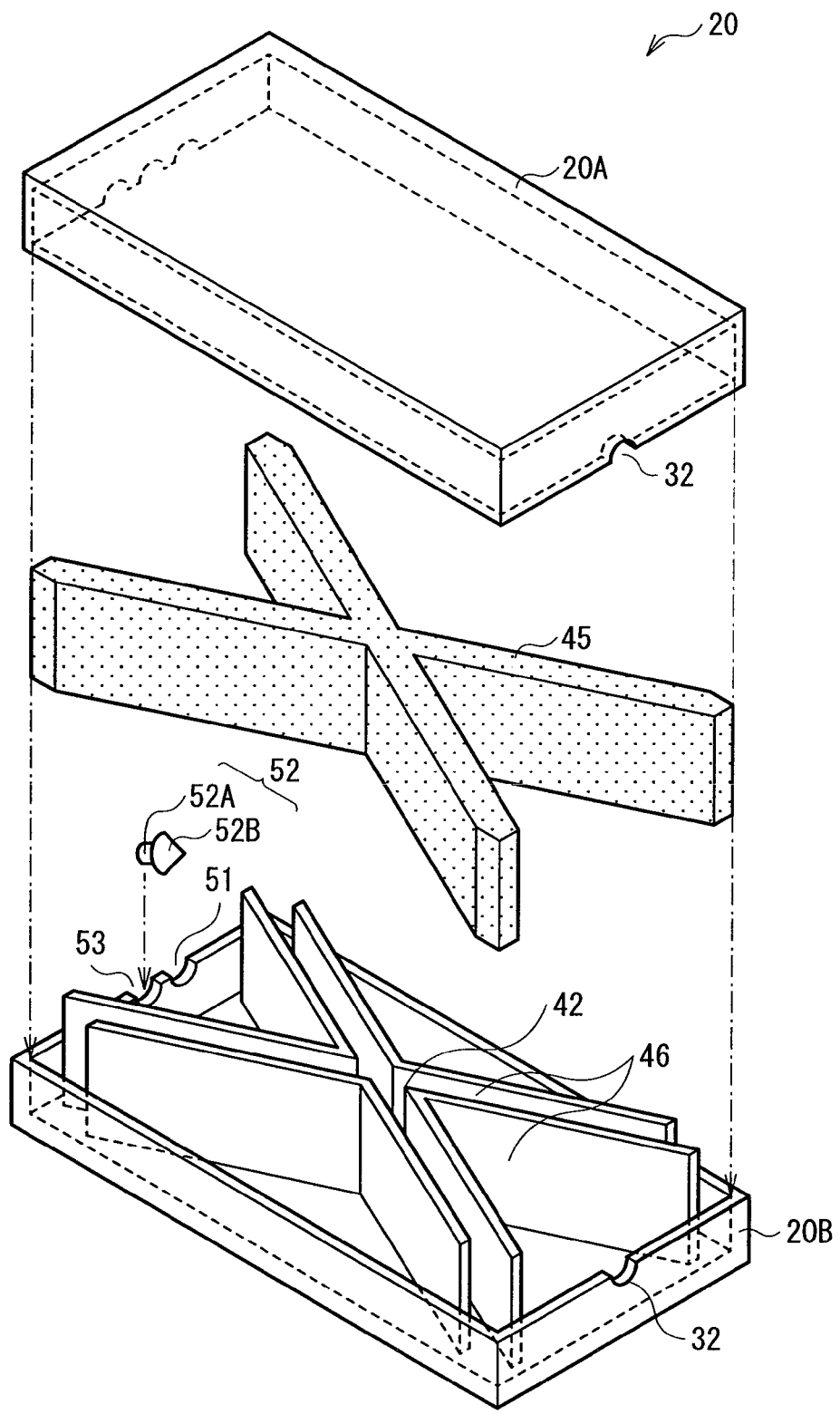
FIG. 11 is an exploded perspective view illustrating a structure of a tank body and a tubular structure according to a modified example of the present invention.

FIG. 11 illustrates a structure of the liquid tank 20 according to a modified example of the foregoing embodiment. The liquid tank 20 has the structure similar to that of the foregoing embodiment except that the tubular structure 40 is integrated with the tank body 30, and the action and the effect thereof are similar to those of the foregoing embodiment. Thus, the same referential symbols are affixed to the same elements.

The tank body 30 has an upper package 20A and a lower package 20B. In the lower package 20B, a wall 46 as part of the duct line 41 is formed. The space surrounded by the upper package 20A, the lower package 20B, and the wall 46 is the duct line 41. The wall 46 may be provided in the upper package 20A.

In the tubular structure 40, the inner structure 45 described in the foregoing embodiment is provided.

The tank body 30 integrated with the tubular structure 40 may be made of the metal material listed in the foregoing embodiment. Otherwise, the tank body 30 integrated with the tubular structure 40 may be made of a synthetic resin having low methanol transmission and a high impact strength, for example, cyclic olefin copolymer (COC). In particular, in the case where the tank body 30 and the tubular structure 40 are made of a synthetic resin, the X-shape of the tubular structure 40 works as a diagonal bracing, and an advantage of largely contributing to the strength is obtainable.

Such tubular structure 40 and the tank body 30 can be manufactured, for example, as follows. First, pellets made of the foregoing synthetic resin are press-molded into a state of a block. The resultant is provided with cutting work, and thereby the upper package 20A and the lower package 20B are formed, and the walls 46 are formed in one thereof. Further, the inner structure 45 is formed in the manner similar to that of the foregoing embodiment. Next, the inner structure 45 is arranged in the space between the walls 46, and the upper package 20A and the lower package 20B are assembled. Thereby, the tank body 30 integrated with the tubular structure 40 illustrated in FIG. 11 is completed.

The present invention has been described with reference to the embodiment. However, the present invention is not limited to the foregoing embodiment, and various modifications may be made. For example, in the foregoing embodiment, the description has been given of the case that the specific position 41A as the starting point of the duct line 41 is located at the central position of the tank body 30. However, the location of the specific position 41A is not limited thereto, and can be adequately selected according to the arrangement posture of the tank body 30. For example, in the case where the tank body 30 is often arranged downward (with the upper cover 31 down) relatively, the specific position 41A may be located lower than the central position.

Further, for example, the material and the thickness of each element, power generation conditions of the fuel cell and the like are not limited to those described in the foregoing embodiment. Other material, other thickness, or other power generation conditions may be adopted. For example, the liquid fuel 21 may be other liquid fuel such as ethanol and dimethyl ether in addition to methanol.

Further, the liquid tank of the present invention is applicable not only to the fuel cell, but also to a fuel tank of a device using a combustion fuel such as kerosene, light oil, and gasoline (a lighting torch, a heater, an engine and the like); an ink cartridge in an ink jet printer, a spray gun, a perfume bottle and the like.

It should be understood that various changes and modifications to the presently preferred embodiments described herein will be apparent to those skilled in the art. Such changes and modifications can be made without departing from the spirit and scope of the present invention and without diminishing its intended advantages. It is therefore intended that such changes and modifications be covered by the appended claims.

The invention claimed is:
1. A liquid tank comprising:
  a tank body into which a liquid is enclosed; and
  a tubular structure provided in the tank body, and having a duct line extending from a specific position in the tank body in a direction toward two or more apexes, sides, or faces of the tank body,
  wherein the duct line includes a plurality of ends that are contacted with the apexes, the sides, or the faces of the tank body and each have a liquid inlet, and
  wherein the tubular structure allows entrance of the liquid to duct line only at the ends of the duct line,
  an inner structure having voids through which the liquid passes in the tubular structure, wherein the voids have an average pore diameter with which the liquid is able to be suctioned from the inlet to the specific position by capillary force, and
  wherein the specific position is provided with a connection hole and a needle connects the connection hole through an opening of the tank body.

2. The liquid tank according to claim 1, wherein the inner structure is made of at least one of a porous body, a spongy material, a foam, a fibrous material, and a bundle of smaller tubes.

3. The liquid tank according to claim 1, wherein the inner structure is made of a material having a contact angle θ of the liquid of less than 90 deg.

4. The liquid tank according to claim 1, wherein the tank body is in the shape of a rectangular solid, and
  the duct lines extend from the specific position in a direction toward eight apexes of the tank body, and the ends of the duct lines are contacted with the eight apexes of the tank body.

5. The liquid tank according to claim 1, wherein the tank body is in the shape of a rectangular solid in which a length of four sides in a thickness direction is shorter than a length of four sides in a width direction and a length of four sides in a height direction, and
  the duct lines extend from the specific position in a direction toward the four sides in the thickness direction of the tank body, and the ends of the duct lines are contacted with the four sides in the thickness direction of the tank body.

6. The liquid tank according to claim 1, wherein the tank body is in the shape of a cylinder having two end faces and a side face between the two end faces, and
  the duct line extends from the specific position in a direction toward the two end faces of the tank body, and the ends of the duct line are contacted with the two end faces of the tank body.

7. The liquid tank according to claim 1, wherein the tank body has an air inlet, and the inlet is provided with a mechanism to limit directions of air flow and liquid flow to one direction into the tank body.

8. The liquid tank according to claim 1, wherein the specific position is located at a central position of the tank body.

9. The liquid tank according to claim 1, wherein the duct line is composed of one tube, and has an inner diameter with which the liquid is able to be suctioned from the inlet to the specific position by capillary force.

10. A tubular structure for a liquid tank provided in a tank body into which a liquid is enclosed, comprising:
  a duct line extending from a specific position in the tank body in a direction toward two or more apexes, sides, or faces of the tank body,
  wherein the duct line includes a plurality of ends that are contacted with the apexes, the sides, or the faces of the tank body and each have a liquid inlet, and
  wherein the tubular structure allows entrance of the liquid to duct line only at the ends of the duct line,
  an inner structure having voids through which the liquid passes in the tubular structure, wherein the voids have an average pore diameter with which the liquid is able to be suctioned from the inlet to the specific position by capillary force, and
  wherein the specific position is provided with a connection hole and a needle connects the connection hole through an opening of the tank body.

11. A fuel cell comprising:
  a power generation section; and
  a fuel tank, wherein
  the fuel tank includes
  a tank body into which a liquid fuel is enclosed, and
  a tubular structure provided in the tank body, and having a duct line extending from a specific position in the tank body in a direction toward two or more apexes, sides, or faces of the tank body,
  wherein the duct line includes a plurality of ends that are contacted with the apexes, the sides, or the faces of the tank body and each have a liquid fuel inlet, and
  wherein the tubular structure allows entrance of the liquid fuel to the duct line only at the ends of the duct line,
  an inner structure having voids through which the liquid fuel passes in the tubular structure, wherein the voids have an average pore diameter with which the liquid fuel is able to be suctioned from the inlet to the specific position by capillary force, and
  wherein the specific position is provided with a connection hole and a needle connects the connection hole through an opening of the tank body.

12. An electronic device containing a fuel cell including a power generation section and a fuel tank, wherein the fuel tank comprises:
  a tank body into which a liquid fuel is enclosed; and
  a tubular structure provided in the tank body, and having a duct line extending from a specific position in the tank body in a direction toward two or more apexes, sides, or faces of the tank body,
  wherein the duct line includes a plurality of ends that are contacted with the apexes, the sides, or the faces of the tank body and each have a liquid fuel inlet, and
  wherein the tubular structure allows entrance of the liquid fuel to the duct line only at the ends of the duct line,
  an inner structure having voids through which the liquid fuel passes in the tubular structure, wherein the voids have an average pore diameter with which the liquid fuel is able to be suctioned from the inlet to the specific position by capillary force, and
  wherein the specific position is provided with a connection hole and a needle connects the connection hole through an opening of the tank body.

13. The liquid tank according to claim 1, comprising a plurality of duct lines, wherein each of the plurality of duct lines extends a distance from the specific position to a corresponding apex, and wherein the distance from the specific position to the corresponding apex is equal for each duct line.

* * * * *